US012124809B2

(12) United States Patent
Han et al.

(10) Patent No.: US 12,124,809 B2

(45) Date of Patent: Oct. 22, 2024

(54) ELECTRONIC APPARATUS FOR SUMMARIZING A SENTENCE BASED ON A USER PREFERENCE AND CONTROL METHOD THEREOF

(71) Applicant: Samsung Electronics Co., Ltd., Suwon-si (KR)

(72) Inventors: Junkyu Han, Suwon-si (KR); Kyuho Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 17/248,934

(22) Filed: Feb. 12, 2021

(65) Prior Publication Data

US 2021/0248326 A1 Aug. 12, 2021

(30) Foreign Application Priority Data

Feb. 12, 2020 (KR) ........................ 10-2020-0016825

(51) Int. Cl.

*G06F 40/40* (2020.01)
*G06F 16/34* (2019.01)
*G06F 16/93* (2019.01)
*G06F 40/279* (2020.01)

(52) U.S. Cl.

CPC ............ *G06F 40/40* (2020.01); *G06F 16/345* (2019.01); *G06F 16/93* (2019.01); *G06F 40/279* (2020.01)

(58) Field of Classification Search

CPC ........ G06F 40/40; G06F 16/345; G06F 16/93; G06F 40/279

See application file for complete search history.

(56) References Cited

U.S. PATENT DOCUMENTS 5,907,841 A * 5/1999 Sumita ................ G06F 16/3344 707/999.005
6,493,663 B1 * 12/2002 Ueda ..................... G06F 40/211 715/236

(Continued)

FOREIGN PATENT DOCUMENTS

CN 110941712 A * 3/2020 ........... G06F 16/335
JP H10-40267 A 2/1998

(Continued)

OTHER PUBLICATIONS

Translation of CN-110941712 Sun L, Wang, Zhi et al., Mar. 31, 2020 (Year: 2020).*

(Continued)

*Primary Examiner* — Benjamin Smith

(57) ABSTRACT

An electronic apparatus is disclosed. The electronic apparatus includes a memory configured to store at least one instruction. The electronic apparatus also includes a processor, connected to the memory, and configured to control the electronic apparatus. The processor is further configured to identify a type corresponding to each of a plurality of sentences included in a document. The processor is also configured to group the plurality of sentences into a plurality of sentence groups based on the identified type, and summarize at least one sentence included in each of the plurality of sentence groups based on a user's preference for types of each of the plurality of sentence groups.

16 Claims, 9 Drawing Sheets

(56) References Cited

U.S. PATENT DOCUMENTS 7,376,893 B2 * 5/2008 Chen .................... G06F 16/345 715/255
7,565,372 B2 * 7/2009 Zhang .................. G06F 16/345 707/999.102
8,250,074 B2 * 8/2012 Lee ...................... G06F 16/345 707/706
8,315,873 B2 11/2012 Mori
8,594,998 B2 * 11/2013 Litvak ................... G06Q 10/10 704/8
8,650,483 B2 * 2/2014 Liu ...................... G06F 16/345 715/254
9,055,115 B2 * 6/2015 Bell ..................... G06F 16/489
9,189,514 B1 * 11/2015 Myslinski .......... G06F 16/3331
9,454,562 B2 * 9/2016 Myslinski ......... G06F 16/90332
9,554,258 B2 * 1/2017 Harber .................. G06Q 50/01
9,767,186 B2 * 9/2017 Bhandari ............. G06F 16/338
9,852,111 B2 * 12/2017 Dasgupta ............. G06F 40/258
9,875,218 B2 * 1/2018 Dasgupta ............. G06F 40/258
10,133,731 B2 * 11/2018 Zelenkov ............. G06F 16/345
10,430,468 B2 10/2019 Jeong et al.
10,691,737 B2 * 6/2020 Parikh .................. G06F 16/345
10,831,806 B2 * 11/2020 Feigenblat ............. G06F 16/93
11,017,179 B2 * 5/2021 Hutchins ................ G06F 40/35
11,048,880 B2 * 6/2021 Ghatak .................. G06F 40/30
11,080,598 B2 * 8/2021 Kotri .................... G06F 40/284
11,086,888 B2 * 8/2021 Lamburt .............. G06F 16/435
11,170,059 B2 * 11/2021 Cardonha .......... G06F 16/9535
11,238,068 B2 * 2/2022 Bhadury ................ H04L 67/10
11,256,735 B2 * 2/2022 Narth ................... G06F 16/248
11,341,203 B2 * 5/2022 Jolly ................. G06Q 30/0282
2002/0078090 A1 * 6/2002 Hwang ................ G06F 16/353 715/201
2004/0117725 A1 * 6/2004 Chen .................... G06F 40/289 715/254
2005/0091203 A1 * 4/2005 Liu ...................... G06F 16/345
2005/0137869 A1 6/2005 Sihn et al.
2006/0206806 A1 * 9/2006 Han ..................... G06F 16/345 715/236
2007/0061356 A1 * 3/2007 Zhang .................. G06F 16/345 707/999.102
2010/0205169 A1 * 8/2010 Narayan ................ H04L 67/55 707/711
2010/0287162 A1 * 11/2010 Shirwadkar .......... G06F 16/345 707/750
2011/0087671 A1 * 4/2011 Lee ...................... G06F 16/345 707/741
2012/0035912 A1 * 2/2012 Litvak .................. G06F 16/345 704/8
2013/0031034 A1 * 1/2013 Gubin ................... G06Q 50/01 706/12
2013/0262476 A1 * 10/2013 Barak .................. G06F 16/958 707/748
2014/0164302 A1 6/2014 Di Fabbrizio et al.
2014/0222834 A1 * 8/2014 Parikh ................ G06F 16/9535 707/748
2015/0212977 A1 * 7/2015 Dasgupta ............... G06F 16/93 715/254
2015/0213120 A1 * 7/2015 Dasgupta ............... G06F 16/93 707/608
2015/0289120 A1 * 10/2015 Harber ................... H04L 67/12 455/414.3
2015/0339288 A1 * 11/2015 Baker .................. G06F 40/166 704/9
2016/0070785 A1 * 3/2016 Myslinski ............ G06F 40/237 707/754
2016/0070786 A1 * 3/2016 Myslinski ......... G06F 16/90332 709/204
2016/0140221 A1 5/2016 Park et al.
2016/0147894 A1 * 5/2016 Lu ...................... G06F 16/9535 707/706
2016/0253318 A1 * 9/2016 Lee ........................ G06F 40/40 704/4
2017/0068654 A1 3/2017 Jeong et al.
2017/0228369 A1 * 8/2017 Zelenkov ............. G06F 16/345
2017/0286546 A1 * 10/2017 Cardonha .......... G06F 16/9535
2017/0371856 A1 12/2017 Can et al.
2018/0032608 A1 * 2/2018 Wu ...................... G06F 16/345
2019/0114298 A1 4/2019 Acharya et al.
2019/0121811 A1 * 4/2019 Cherukuri ............ H04L 67/535
2019/0163758 A1 * 5/2019 Zhivotvorev ..... G06F 16/24578
2019/0354848 A1 * 11/2019 Kotri ....................... G06F 9/451
2020/0004790 A1 1/2020 Jeong et al.
2020/0090247 A1 * 3/2020 Sokolov ............ G06Q 30/0264
2020/0104332 A1 * 4/2020 Bhadury ............ G06F 16/9035
2020/0110754 A1 * 4/2020 Lamburt .......... G06F 16/24578
2020/0134039 A1 * 4/2020 Alam ................. G06F 16/3326
2020/0134091 A1 * 4/2020 Feigenblat .......... G06F 16/3334
2020/0175039 A1 * 6/2020 Bhadury ............... G06F 16/355
2020/0210521 A1 * 7/2020 Hutchins ............... G06F 16/986
2020/0233925 A1 * 7/2020 Reyes Ramirez ..... A61B 5/167
2020/0233926 A1 * 7/2020 Ghatak ................ G06Q 10/107
2020/0242142 A1 * 7/2020 Connell, II ......... G06F 16/3329
2020/0311114 A1 * 10/2020 Sood .................... G06F 16/345
2021/0103626 A1 * 4/2021 Jolly ..................... G06F 16/345
2021/0117617 A1 * 4/2021 Blaya .................... G06F 40/253
2021/0124770 A1 * 4/2021 Parikh ................ G06F 16/9535
2021/0141790 A1 * 5/2021 Narth .................... G06F 16/958
2021/0141846 A1 * 5/2021 Parmiter ............... G06F 40/166
2021/0382953 A1 * 12/2021 Eggleston, IV .... G06F 16/9024
2021/0390150 A1 * 12/2021 Eggleston, IV ...... G06F 16/906
2022/0138242 A1 * 5/2022 Narth .................... G06F 16/248 707/776

FOREIGN PATENT DOCUMENTS

JP 2003-044072 A 2/2003
JP 2003-208192 A 7/2003
JP 2008-077459 A 4/2008
JP 2009-217802 A 9/2009
JP 5530393 B2 6/2014
KR 10-0608677 B1 8/2006
KR 10-2016-0058587 A 5/2016
KR 10-2017-0030434 A 3/2017
KR 10-1754473 B1 7/2017
KR 10-2019-0104656 A 9/2019

OTHER PUBLICATIONS

DongKeon Lee et al., "Measuring the Syntactic Similarity between Korean Sentences Using RNN," Korea Computer Congress 2016, Jul. 1, 2016, 4 pages.

International Search Report and Written Opinion of the International Searching Authority in connection with International Application No. PCT/KR2021/000711 issued Apr. 23, 2021, 8 pages.

* cited by examiner

FIG. 2C

FIRST SENTENCE (WEATHER)

SECOND SENTENCE (WEATHER)

THIRD SENTENCE (DESCRIPTION)

FIG. 5

| apple | 395 |
|---|---|
| sea | 255 |
| Kim | 231 |
| phone | 111 |
| ⋮ | ⋮ |

ELECTRONIC APPARATUS FOR SUMMARIZING A SENTENCE BASED ON A USER PREFERENCE AND CONTROL METHOD THEREOF

CROSS-REFERENCE TO RELATED APPLICATION

This application is based on and claims priority under 35 U.S.C. § 119 to Korean Patent Application No. 10-2020-0016825, filed on Feb. 12, 2020, in the Korean Intellectual Property Office, the disclosure of which is incorporated by reference herein in its entirety.

BACKGROUND

1. Field

The disclosure relates to an electronic apparatus and a control method thereof. More particularly, the disclosure relates to an electronic apparatus for summarizing a plurality of sentences and a control method thereof.

2. Description of Related Art

Various technologies for summarizing documents have been developed recently. One of the technologies is a technology for searching words having a meaning similar to a word used in a title in a body of a document and summarizing a document focusing on the searched words. Additionally, a user's preference may be reflected to summarize a document based on information such as the number of times a user accesses a link of another document including the words used in the title, a user's gender, age, or the like.

However, these technologies may only be applicable to relatively short writings with a clear title. That is, these technologies may be applicable to only a document in a type similar to a news article, and in the case of a document, such as a literary work, of which entire writing is long or which is composed of several paragraphs having a similar level of importance, critical contents are likely to be omitted.

Even if whether to summarize is determined based on the information of a user's gender, age, or the like, the user's preference may not be accurately reflected. Even if the user's preference is recognized by the number of accesses of a user to a link of another document including the words used in a title of a document, there may be a disadvantage that a clear method of determining which content should be omitted and which content should be summarized is not provided.

There is a need to develop clear guideline that can clearly reflect a user's preference, and how to summarize a document.

SUMMARY

Example embodiments of the disclosure address at least the above-mentioned problems and/or disadvantages and provide at least the advantages described below. The purpose of the disclosure is to provide an electronic apparatus for summarizing a long document such as a literary work by reflecting a user's preference and a control method thereof.

According to an embodiment, an electronic apparatus includes a memory configured to store at least one instruction and a processor, connected to the memory, configured to control the electronic apparatus, and the processor is further configured to identify a type corresponding to each of a plurality of sentences included in a document, group the plurality of sentences into a plurality of sentence groups based on the identified type, and summarize at least one sentence included in each of the plurality of sentence groups based on a user's preference for types of each of the plurality of sentence groups.

The processor may further be configured to, based on a user interaction being input, update a user's preference for types of each of the plurality of sentence groups based on the user interaction.

The electronic apparatus may further include an outputter, and the processor is further configured to, based on the user's preference for a type of a first sentence group, among the plurality of sentence groups, being greater than or equal to a first threshold value, control the outputter to output the first sentence group in a non-summarized state, and based on the user's preference for a type of the first sentence group being less than the first threshold value, summarize the first sentence group, and control the outputter to output the summarized first sentence group.

The electronic apparatus may further include an inputter, and the processor may further be configured to, based on the user interaction being input through the inputter while the first sentence group is being output, update the user's preference for the type of the first sentence group based on the user interaction.

The processor may be further configured to, based on the user interaction being a skip command or a summary command, decrease the user's preference for the type of the first sentence group, and based on the user interaction not being present, increase the user's preference for the type of the first sentence group.

The processor may be further configured to, based on the user's preference for the type of the first sentence group being less than the first threshold value and greater than or equal to a second threshold value, summarize the first sentence group to a first summary level, based on the user's preference for the type of the first sentence group being less than the second threshold value and greater than or equal to a third threshold value, summarize the first sentence group to a second summary level which is simpler than the first summary level, and based on the user's preference for the type of the first sentence group being less than the third threshold value, skip the first sentence group and control the outputter to output a second sentence group right after the first sentence group.

The processor may be further configured to summarize the first sentence group to the first summary level by decreasing a number of a plurality of sentences included in the first sentence group by a first ratio, and summarize the first sentence group to the second summary level by decreasing the number of the plurality of sentences included in the first sentence group by a second ratio which is less than the first ratio.

The processor may be further configured to obtain an importance level of each of a plurality of sentences included in the first sentence group based on a frequency of a word included in the first sentence group from the document, and summarize the first sentence group based on the level of importance of each of the plurality of sentences included in the first sentence group.

The processor may be further configured to identify a frequency of a plurality of words included in the document, identify a word of a first number as a first critical word based on the frequency of the plurality of words, and summarize at least one sentence included in each of the plurality of sentence groups based on the user's preference for types of each of the plurality of sentence groups and the first critical word.

The processor may be further configured to re-identify a frequency of a plurality of additional words included in a sentence same as the first number of words, identify an additional word of a second number as a second critical word based on the frequency of the plurality of additional words, and summarize at least one sentence included in each of the plurality of sentence groups based on the user's preference for types of each of the plurality of sentence groups, the first critical word, and the second critical word.

The memory may be further configured to store a score with respect to a plurality of types representing each of a plurality of words, and the processor is further configured to identify a type of the one sentence based on a score of a plurality of types representing each of a word included in one sentence among the plurality of sentence groups.

The processor may be further configured to, based on the type of the one sentence being identified, update at least one of a plurality of types representing each of a word included in the one sentence or a score of each type based on the identified type.

The processor may be further configured to divide the plurality of sentences into the plurality of sentence groups by identifying at least one sentence that has a same type and is adjacent to each other, from the plurality of sentences, into one sentence group.

According to an embodiment, a control method of an electronic apparatus includes identifying a type corresponding to each of a plurality of sentences included in a document; grouping the plurality of sentences into a plurality of sentence groups based on the identified type; and summarizing at least one sentence included in each of the plurality of sentence groups based on a user's preference for types of each of the plurality of sentence groups.

The method may further include, based on a user interaction being input, updating a user's preference for types of each of the plurality of sentence groups based on the user interaction.

The summarizing may include, based on the user's preference for a type of a first sentence group, among the plurality of sentence groups, being greater than or equal to a first threshold value, outputting the first sentence group in a non-summarized state, and based on the user's preference for a type of the first sentence group being less than the first threshold value, summarizing the first sentence group, and outputting the summarized first sentence group.

The updating may further include, based on the user interaction being input through the inputter while the first sentence group is being output, updating the user's preference for the type of the first sentence group based on the user interaction.

The updating may include, based on the user interaction being a skip command or a summary command, decreasing the user's preference for the type of the first sentence group, and based on the user interaction not being present, increasing the user's preference for the type of the first sentence group.

The summarizing may include, based on the user's preference for the type of the first sentence group being less than the first threshold value and greater than or equal to a second threshold value, summarizing the first sentence group to a first summary level, based on the user's preference for the type of the first sentence group being less than the second threshold value and greater than or equal to a third threshold value, summarizing the first sentence group to a second summary level which is simpler than the first summary level, and based on the user's preference for the type of the first sentence group being less than the third threshold value, skipping the first sentence group and outputting a second sentence group right after the first sentence group.

The summarizing to the first summary level may include summarizing the first sentence group to the first summary level by decreasing a number of a plurality of sentences included in the first sentence group by a first ratio, and the summarizing to the second summary level may include summarizing the first sentence group to the second summary level by decreasing the number of the plurality of sentences included in the first sentence group by a second ratio which is less than the first ratio.

The method may further include obtaining an importance level of each of a plurality of sentences included in the first sentence group based on a frequency of a word included in the first sentence group from the document, and the summarizing ma include summarizing the first sentence group based on the level of importance of each of the plurality of sentences included in the first sentence group.

The method may further include identifying a frequency of a plurality of words included in the document and identifying a word of a first number as a first critical word based on the frequency of the plurality of words, and the summarizing may include summarizing at least one sentence included in each of the plurality of sentence groups based on the user's preference for types of each of the plurality of sentence groups and the first critical word.

The method may further include re-identifying a frequency of a plurality of additional words included in a sentence same as the first number of words and identifying an additional word of a second number as a second critical word based on the frequency of the plurality of additional words, and the summarizing may include summarizing at least one sentence included in each of the plurality of sentence groups based on the user's preference for types of each of the plurality of sentence groups, the first critical word, and the second critical word.

The identifying may include identifying a type of the one sentence based on a score of a plurality of types representing each of a word included in one sentence among the plurality of sentence groups.

The method may further include, based on the type of the one sentence being identified, updating at least one of a plurality of types representing each of a word included in the one sentence or a score of each type based on the identified type.

The method may include dividing the plurality of sentences into the plurality of sentence groups by identifying at least one sentence that has a same type and is adjacent to each other, from the plurality of sentences, into one sentence group.

According to various embodiments, the electronic apparatus may group a plurality of sentences included in a document into a plurality of sentence groups by types, and may summarize a document in reflection of a user's preference by summarizing each of a plurality of sentence groups based on the user's preference for the types of each of the plurality of sentence groups.

The electronic apparatus may update the user's preference for the types of each of the plurality of sentence groups according to a user interaction, thus capable of reflecting the user's preference more actively.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and/or other aspects, features, and advantages of certain embodiments of the present disclosure will be more apparent from the following description taken in conjunction with the accompanying drawings, in which:

FIG. 2C illustrates a diagram illustrating an example method of grouping a plurality of sentences according to an embodiment;

FIG. 5 illustrates a diagram illustrating output of a sentence group according to a critical word according to an embodiment.

DETAILED DESCRIPTION

Figure 1A:
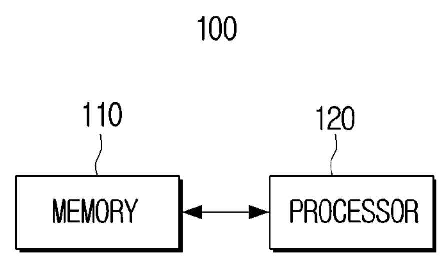
FIG. 1A illustrates a block diagram of an example hardware configuration of an electronic apparatus according to an embodiment.

FIGS. 1A through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Hereinafter, this disclosure will be further described with reference to the accompanying drawings.

The terms used in the present specification and the claims are general terms identified in consideration of the functions of the various embodiments of the disclosure. However, these terms may vary depending on intention, technical interpretation, emergence of new technologies, and the like of those skilled in the related art. Some terms may be selected by an applicant arbitrarily, and the meaning thereof will be described in the detailed description. Unless there is a specific definition of a term, the term may be construed based on the overall contents and technological understanding of those skilled in the related art.

In this specification, the expressions "have," "may have," "include," or "may include" or the like represent presence of a corresponding feature (for example: components such as numbers, functions, operations, or parts) and does not exclude the presence of additional feature.

The expression "At least one of A or/and B" should be understood to represent "A" or "B" or any one of "A and B."

As used herein, the terms "first," "second," or the like may denote various components, regardless of order and/or importance, and may be used to distinguish one component from another, and does not limit the components.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, a term user may refer to a person using an electronic apparatus or an apparatus (for example: artificial intelligence (AI) electronic apparatus) that uses an electronic apparatus.

Hereinafter, embodiments of the disclosure will be described in detail with reference to the accompanying drawings.

FIG. 1A illustrates a block diagram of an example hardware configuration of an electronic apparatus 100 according to an embodiment.

The electronic apparatus 100 is an apparatus for summarizing a document and may be an apparatus to output a summarized document as a sound, such as a speaker. The speaker may be a configuration of another device such as a television (TV), a desk top personal computer (PC), a notebook, or the like.

The electronic apparatus 100 may be an apparatus which includes a display such as a TV, a desktop PC, a notebook PC, a video wall, a large format display (LFD), a digital signage, a digital information display (DID), a projector display, a digital video disk (DVD) player, a smartphone, a tablet PC, a monitor, a smart glasses, a smart watch, and directly displays a summarized document.

The electronic apparatus 100 may be an apparatus which is not equipped with a speaker or a display, such as a set-top box (STB), a computer's main body, or the like, and may be an apparatus which provides the summarized document to a device or display device provided with a speaker. However, embodiments in accordance with this disclosure are not limited thereto and any apparatus that may summarize a document is available as the electronic apparatus 100.

The document includes a plurality of sentences, and summarizing of the document may mean deleting some of the plurality of sentences or changing each of the plurality of sentences to a shorter sentence. Alternatively, a summary of the document may refer to extracting and reconstructing a significant content from a plurality of sentences.

Referring to FIG. 1A, the electronic apparatus 100 includes a memory 110 and a processor 120. However, embodiments in accordance with this disclosure are not limited thereto, and the electronic apparatus 100 may be implemented as a type to exclude some configurations.

The memory 110 may refer to a hardware that stores information such as data as an electric or magnetic form so that the processor 120, or the like, may access, and the memory 110 may be implemented as at least one hardware among a non-volatile memory, a volatile memory, a flash memory, a hard disk drive (HDD) or solid state drive (SSD), random access memory (RAM), read-only memory (ROM), or the like.

The memory 110 may store at least one instruction, program, or data used for operation of the electronic apparatus 100 or the processor 120. The instruction is a code unit that directs the operation of the electronic apparatus 100 or the processor 120, and may be written in a machine language that can be understood by a computer. A module may be an instruction set of a series of instructions that perform a particular task of a task unit.

The memory 110 may store data which is information in bit unit or byte unit that may represent characters, numbers, images, or the like. For example, the memory 110 may store data such as a document including a plurality of sentences.

Information about a type which a word represents may be stored in the memory 110. For example, a word "wind" may be expressed as a type such as "weather (10)", "context (4)", and "description (2)", and the memory 110 may store words and information that a type matches the word. The number in the parenthesis of each type may refer to a score for the word, and the higher the score, the more appropriate as a type of the word. For example, for the "wind", "weather" type of which score is 10 may be more suitable rather than "context" of which score is 4 and "description" of which score is 2. Although the word "wind" is described, the memory 110 may store the plurality of words and information that a type corresponding to each of the plurality of words matches a plurality of words, and this information can be a predefined state. However, a score of a type matched with each of the plurality of words may be updated in a summary process of the document.

A user's preference for each type may be stored in the memory 110. For example, the memory 110 may store a user's preference for a type of "weather", a user's preference for a type of "context," or the like. The user's preference may be a state set to not perform a summarization until the user's interaction is entered. Thereafter, a summary operation or a skip operation may be further performed by increasing or decreasing the user's preference according to the user interaction.

The AI model may include a plurality of neural network layers. Each of the layers includes a plurality of weight values, and may perform a neural network processing operation through an iterative operation leveraging results of a previous layer and a plurality of weight values. Examples of a neural network includes convolutional neural network (CNN), deep neural network (DNN), recurrent neural network (RNN), restricted Boltzmann machine (RBM), deep belief network (DBN), bidirectional recurrent deep neural network (BRDNN), deep Q-networks, or the like. In the disclosure, various neural network may be used in addition to the neural network mentioned. The AI model may be configured with an ontology-based data structure which is represented as a format in which various concepts, conditions, relations, or agreed-upon knowledge are represented as a format processible by computer.

The AI model may be trained through a separate server and/or system or the electronic apparatus 100 using various learning algorithms. Learning algorithm is a method of training a predetermined target device (e.g., robot) using a enough learning data so that the predetermined target device can make a decision or prediction by itself. Examples of learning algorithms include, but are not limited to, supervised learning, unsupervised learning, semi-supervised learning, or reinforcement learning, and various learning algorithms may be used.

The memory 110 may be accessed by the processor 120, and reading/writing/modifying/updating of data by the processor 120 may be performed associated with the instructions, modules, AI model or data.

The processor 120 may control overall operations of the electronic apparatus 100. The processor 120 may be connected to each configuration of the electronic apparatus 100 to control overall operations of the electronic apparatus 100. For example, the processor 120 may be connected to a memory 110, a speaker (not shown), a microphone (not shown), a display (not shown), a communication interface (not shown), or the like, for controlling the operation of the electronic apparatus 100.

The processor 120 according to an embodiment may be implemented with a digital signal processor (DSP), a microprocessor, and a time controller (TCON), or the like, but the processor is not limited thereto. The processor 120 may include, for example, and without limitation, one or more among a central processor (CPU), a micro controller unit (MCU), a microprocessor unit (MPU), a controller, an application processor (AP), a communication processor (CP), an advanced reduced instruction set computing (RISC) machine (ARM) processor, a dedicated processor, or may be defined as a corresponding term. The processor 120 may be implemented in a system on chip (SoC) type or a large scale integration (LSI) type which a processing algorithm is built therein, application specific integrated circuit (ASIC), or in a field programmable gate array (FPGA) type.

The processor 120 may identify a type corresponding to each of the plurality of sentences included in the document, group the plurality of sentences into a plurality of sentence groups based on the identified type, and summarize at least one sentence included in each of the plurality of sentence groups based on the user's preference for each type of the plurality of sentence groups.

When a user interaction is input, the processor 120 may update a user's preference for each type of a plurality of sentence groups based on the user interaction.

The operation of the processor 120 will be described in greater detail through various modules of FIG. 1B.

Figure 1B:
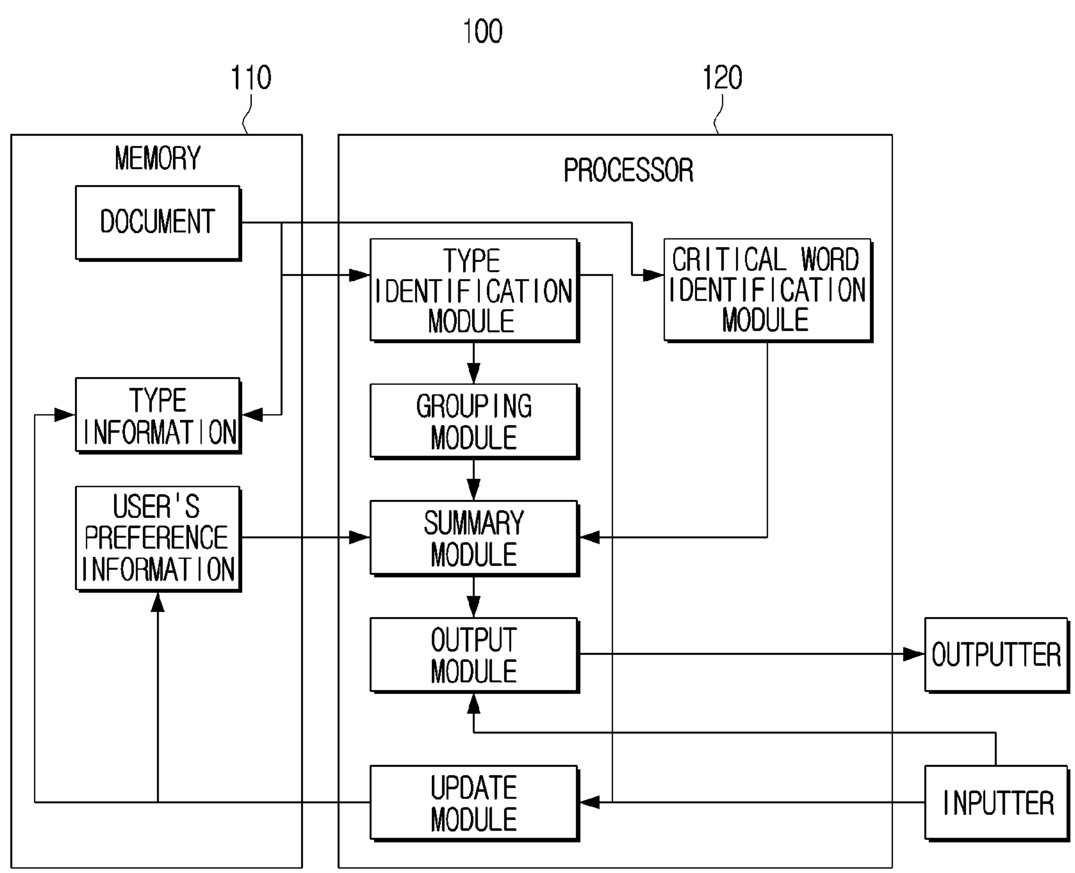
FIG. 1B illustrates a block diagram of an example software configuration of an electronic apparatus according to an embodiment.

FIG. 1B illustrates a block diagram of an example software configuration of the electronic apparatus 100 according to one embodiment. Referring to FIG. 1B, the plurality of modules are positioned inside the processor 120 to represent that the plurality of modules are loaded (or executed) by the processor 120 and operated in the processor 120, and the plurality of modules may be pre-stored in the memory 110.

Referring to FIG. 1B, a document, type information, and user preference information may be stored in the memory 110. Here, the type information includes a score for a plurality of types representing each of the plurality of words, and the user preference information may include a user preference for each of the plurality of types.

The processor 120 may control the overall operation of the electronic apparatus 100 by executing a module or instructions stored in the memory 110. Specifically, the processor 120 may determine a sequence for data processing by reading and interpreting modules or instructions and controlling the operation of other configurations by transmitting a control signal which controls the operation of other configurations, such as the memory 110.

The processor 120 may identify a type corresponding to a plurality of sentences included in the document by executing the type identification module. For example, when a sentence such as "it was a day when piercing wind like a blade blows" is read out, the processor 120 may identify a representative word such as has "wind", "blow", "day", "blade" from the read out sentence. The representative word is a word representing the meaning of the sentence, and may be used to identify the type of the sentence.

The processor 120 may identify a representative word from a sentence using a method such as a term frequency-inverse document frequency (TF-IDF). The TF indicates the frequency of the word, and the IDF refers to a distinct characteristic of a word. The IDF may be obtained based on the number of the entire documents and the number of documents in which the word appears. The processor 120 may calculate the importance for a plurality of words through the TF-IDF, and may identify a word of which importance is greater than or equal to a threshold as a representative word. However, embodiments in accordance with this disclosure are not limited thereto, and the processor 120 may identify a representative word from the sentence in various ways.

The processor 120 may receive a score about a plurality of types representing a representative word from the memory 110. For example, the processor 120 may read out from the memory 110 a type representing "wind", type information such as "weather (10)", "context (4)", "description (2)", a type representing "blow", type information such as "weather (8)", "activity (8)", "description (3)", type representing "day", type information such as "context (8)", "time (7)", "description (5)", type representing "blade", type information such as "battle (10)", "activity (6)", "weather (2)", or the like. The number in the parenthesis may refer to a score for each type.

The processor 120 may identify a type corresponding to a sentence based on the read type information. In the above example, when the scores of each type are summed by the processor 120, the score of "weather" is 20, which is the highest, the processor 120 may identify the corresponding sentence as "weather" type.

If the type of the sentence is identified by the type identification module, the processor 120 may update at least one of a plurality of types representing each of the representative words based on the type identified by executing the update module, or a score for each type. In the above-described example, if the type of the sentence is determined to be "weather", the processor 120 may add "weather" as the type representing "day." The processor 120 may increase the score of "weather" type of "wind," "blow", and "blade." For example, the processor 120 may increase a score of a "weather" type of "wind" from 10 to 11. However, embodiments in accordance with this disclosure are not limited thereto, and the update method may vary.

The processor 120 may perform a grouping module to identify sentences of which type is the same and the adjacent sentences as one sentence group. In this manner, the processor 120 may distinguish each sentence in the document into several sentence groups. For example, the processor 120 may identify the type of the second sentence when the first sentence is identified as the first type and the second sentence after the first sentence is input. The processor 120 may identify the first sentence and the second sentence as the same sentence group if the type of the second sentence is the first type. If the type of the second sentence is identified as the second type, the processor 120 may identify the first sentence and the second sentence in a different sentence group.

The processor 120, by executing a summary module, may not summarize the first sentence group, if the user's preference for the type of the first sentence group, among the plurality of sentence groups, is greater than or equal to a first threshold value, and if the preference of the user for the type of the first sentence group is below the first threshold value, may summarize the first sentence group. The processor 120 may receive a user's preference of the type of the first sentence group from the memory 110. The processor 120 may also summarize the first sentence group using an artificial intelligence model stored in the memory 110.

The processor 120 may also summarize the first sentence group by stages based on the user's preference. For example, the processor 120 may summarize the first sentence group to a first summary level if the preference of the user with respect to the type of the first sentence group is less than the first threshold and greater than or equal to the second threshold value, and if the user's preference for the type of the first sentence group is below the second threshold value and greater than or equal to a third threshold value, summarize the first sentence group to a second summary level that is simpler than the first summary level, and if the user's preference for the type of the first sentence group is below the third threshold, skip the first sentence group. In this case, the processor 120 may summarize the first sentence group by using a plurality of artificial intelligence models. For example, the processor 120 may summarize the first sentence group to a first summary level using a first artificial intelligence model, and may summarize the first sentence group to a second summary level using a second artificial intelligence model.

The processor 120, when a first sentence group is skipped, may summarize a second sentence group right after the first sentence group based on a user's preference for the type of the second sentence group.

The processor 120 may provide a sentence group to an outputter of the electronic apparatus 100 by executing an output module. The sentence group may be a non-summarized sentence group, and may be a summarized sentence group.

The processor 120 may provide a sentence group or a summarized sentence group to a user via an outputter. For example, if the outputter is a speaker or a display, the processor 120 may output a sentence group or a summarized sentence group as sound through a speaker, or display a sentence group or a summarized sentence group through a display.

The speaker is a component to output various notification sounds or a voice message in addition to various audio data processed by the processor 120; and the display is a component to output various video data processed by the processor 120. The display may be implemented as various types of displays such as a liquid crystal display (LCD) panel, organic light emitting diodes (OLED) display panel, a plasma display panel (PDP), micro LED, laser display, virtual reality (VR), glass, and the like. A driving circuit of the display panel can be implemented using one or more of an a-Si thin film transistor (TFT), a low temperature poly silicon (LTPS) TFT, an organic TFT (OTFT), and a backlight. Further, the display may be implemented as at least one of a touch screen coupled with a touch sensor, a flexible display, a three-dimensional (3D) display, or the like.

The outputter may include an input/output interface, and the processor 120 may provide a sentence group or a summarized sentence group to a device equipped with a speaker or a display through the outputter.

The input/output interface may be one of the high-definition multimedia interface (HDMI), mobile high-definition link (MHL), universal serial bus (USB), display port (DP), Thunderbolt, video graphics array (VGA) port, red, green, and blue (RGB) port, d-subminiature (D-SUB), digital visual interface (DVI), and the like.

As a result, by the operation of the processor 120, a part preferred by a user can be identified in detail, and a part that the user does not prefer may be replaced with a summary or skipped.

When a user interaction is received through an inputter of the electronic apparatus 100 while the first sentence group is output, the processor 120 may change the output state of the sentence group based on the user interaction. For example, when the user interaction "please skip" is input, the processor 120 may stop output of the first sentence group currently being output and may output the second sentence group immediately after the first sentence group. Alternatively, when the user interaction of "please summarize" is input, the processor 120 may stop output of the first sentence group currently being output, and may execute the summary module to summarize the first sentence group and output the summarized first sentence group. If the user interaction is not inputted through the inputter, the processor 120 may output the sentence group provided from the summary module as is.

The inputter may be configured to receive a user interaction, such as a microphone. However, embodiments in accordance with this disclosure are not limited thereto, and the inputter may be any configuration for receiving user interaction. For example, the inputter may be implemented with a camera to receive user interaction, such as a user's motion. Alternatively, the inputter may be implemented as a communication interface and may receive a signal corresponding to a user interaction from an external device. For example, the inputter may include a Bluetooth module and may receive a signal corresponding to the user interaction from a remote control device.

The communication interface is configured to communicate with various types of external devices according to various types of communication methods. The communication interface includes a Wi-Fi module, a Bluetooth module, an infrared communication module, a wireless communication module, or the like. Each communication module may be implemented as at least one hardware chip.

The Wi-Fi module and the Bluetooth module perform wireless communication using Wi-Fi method and Bluetooth protocols, respectively. When using the Wi-Fi module or the Bluetooth module, various connection information such as a service set identifier (SSID) and a session key may be transmitted and received to establish a communication session, and communication information may be transmitted after a communication connection is established. The infrared ray communication module performs communication according to infrared data association (IrDA) technology that transmits data wireless to local area using infrared ray between visible rays and millimeter waves.

The wireless communication module may include at least one communication chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication modes described above.

The communication interface may also include at least one of a local area network (LAN) module, Ethernet module, or wired communication module performing communication using a pair cable, a coaxial cable, an optical cable, or the like.

If the user interaction is input through the inputter, the processor 120 may update the user's preference for the type of the first sentence group based on the user interaction by executing the update module. For example, the processor 120 may reduce a user's preference for the type of the first sentence group when the skip command or the summary command is input while the first sentence group is output. Alternatively, the processor 120 may increase the user's preference for the type of the first sentence group if there is no user interaction while the first sentence group is output.

The processor 120 may output the first sentence group by first considering the user interaction with the user's preference even if the preference of the user with respect to the type of the first sentence group changes according to the user interaction while outputting the first sentence group. For example, when the user interaction "please summarize" is input while outputting a first sentence group, the processor 120 may summarize and output the first sentence group based on the user's preference for the type of the first sentence group, and may update the user's preference for the type of the first sentence group. The processor 120 does not skip the first sentence group even if the user's preference with respect to the type of the first sentence group is reduced to the level to be skipped. However, the processor 120 merely skips the sentence group of the same type as the type of the first sentence group after the first sentence group.

In the example description above, summarization and skip are to be performed in consideration of a user's preference.

In this case, there may be a problem that a sentence group which is critical in a document is skipped due to user's preference.

In order to overcome the above problem, an operation to identify a word which is critical in a document, in addition to user's preference, to perform summarization and skip is described.

The processor 120, by executing a critical word identification module, may identify frequency of a plurality of words included in a document and may identify a word of the first number as a first critical word in a descending order of frequency.

By executing a summary module, the processor 120 may summarize at least one sentence included in each of the plurality of sentence groups based on the user's preference and the first critical word for each type of the plurality of sentence groups by executing the summary module.

For example, the processor 120 may not skip the sentence group to be skipped based on the user's preference based on the first critical word. Alternatively, the processor 120 may summarize the sentence group to be skipped based on the user's preference based on the first critical word or output only the sentence included in the first critical word.

The processor 120 may identify the frequency of the plurality of additional words included in the same sentence as the first number of words by executing the critical word identification module, and may identify the second number of additional words in a high order of frequency of re-identification as the second critical words.

The processor 120, by executing a summary module, may summarize at least one sentence included in each of the plurality of sentence groups based on a user's preference, the first critical word, and the second critical word for each type of a plurality of sentence groups. The processor 120 may further use the second critical word to solve the problem of omitting the key content in the document.

In the description above, a user interaction is "please summarize," "please skip," or the like. However, the user interaction may be "please do not summarize", or any other suitable user interaction in accordance with this disclosure. For example, the electronic apparatus 100 may display that the current sentence group is output as being summarized to the user, and if there is a user interaction such as "please do not summarize", the processor 120 may output the summarized sentence group in a non-summarized state.

As described above, the electronic apparatus 100 may identify a type of each of a plurality of letters, group a plurality of sentences into a plurality of sentence groups based on the identified type, and by summarizing at least one sentence included in each of the plurality of sentence groups based on the user's preference for the types of each of the plurality of sentence groups, may efficiently summarize the document in reflection of the user's preference even when a document is lengthy.

Hereinbelow, various embodiments will be described in greater detail with reference to the drawings.

Figure 2A:
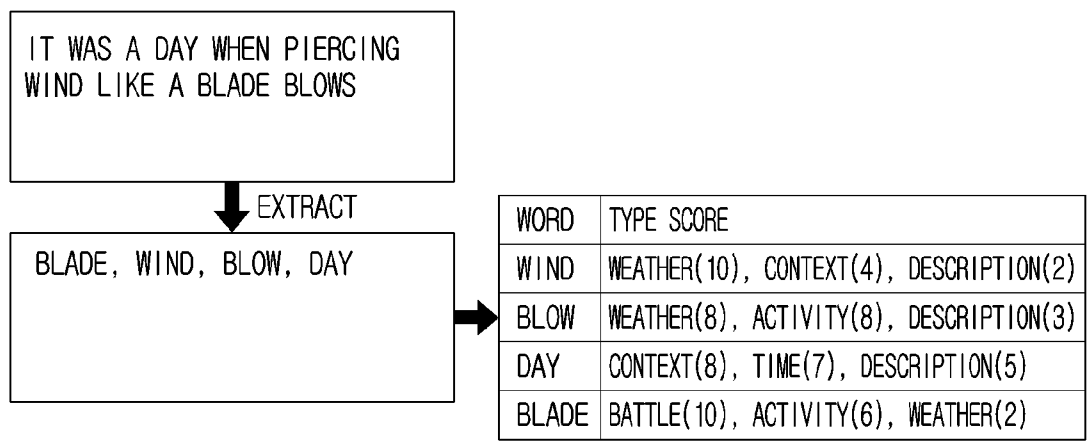
FIG. 2A illustrates a diagram of an example method of grouping a plurality of sentences according to an embodiment.
Figure 2B:
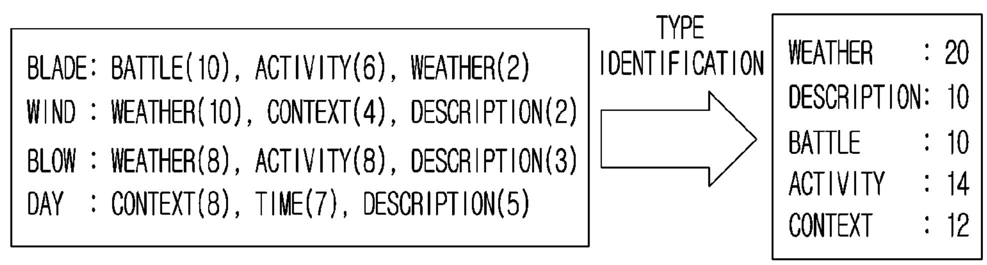
FIG. 2B illustrates a diagram of an example method of grouping a plurality of sentences according to an embodiment.

FIGS. 2A-2C illustrate diagrams of a method of grouping a plurality of sentences according to an embodiment.

The processor 120 may identify a representative word from a sentence. For example, the processor 120 may identify representative words such as "wind", "blow", "day", "blade" from the sentence "it was a day when piercing wind like a blade blows" as illustrated in FIG. 2A.

The processor 120 may identify a representative word from a sentence using a method such as a TF-IDF. Alternatively, the processor 120 may identify a representative word based on a word class of a plurality of words included in the sentence. The processor 120 may identify a representative word from the sentence based on the type information stored in the memory 110. For example, the processor 120 may identify the representative word according to whether the word included in the character is included in the type information.

The memory 110 may store each of a plurality of words and information matched with a type corresponding to each of the plurality of words. In the right side of FIG. 2A, the representative words, and types and scores matched with each of the representative words are illustrated, among the information stored in the memory 110.

The processor 120 may sum up scores by types matched with each of representative words. For example, the processor 120 may sum up the scores for each of types "weather", "description", "battle", "activity" and "context" matched with representative words "wind", "blow", "day", "blade", respectively, as illustrated in FIG. 2B. The processor 120 may determine "weather" with the highest score as the type of "it was a day when piercing wind like a blade blows".

The processor 120 may determine the type of each of the plurality of sentences included in the document in the manner described in FIGS. 2A and 2B. The processor 120 may determine the first sentence and the second sentence as one sentence group if the type of the first sentence among the plurality of sentences is the same as the type of the second sentence after the first sentence, as shown in FIG. 2C. If the type of the second sentence is not the same as the type of the third group after the second sentence, the processor 120 may determine the second sentence and the third sentence in different sentence groups.

In this way, a plurality of sentences may be divided into a plurality of groups. Each of the plurality of groups may include at least one sentence, and one group may not include sentences which are not consecutive.

Referring to FIGS. 2A-2C, as described, one sentence is determined as one type, however, embodiments in accordance with this disclosure are not limited thereto. For example, the processor 120 may calculate type-by-type scores for one sentence; and if the highest score is plural, the one sentence may be determined to be a plurality of types.

If one of the plurality of types is the same as the type of the previous sentence and the other is the same as the type of the subsequent sentence, the processor 120 may include the sentence representing the plurality of types as one of the sentence group of the previous sentence and the sentence group of the subsequent sentence. For example, if the second sentence is determined to be weather and description in the example of FIG. 2C, the processor 120 may determine the first sentence and the second sentence as one sentence group, or determine the second sentence and the third sentence as one sentence. When the first sentence and the second sentence are determined as one sentence group, the sentence group in which the first sentence and the second sentence belong may be different from the sentence group in which the third sentence belongs. When the second sentence and the third sentence are determined as one sentence group, the sentence group in which the second sentence and the third sentence belong may be different from the sentence group in which the first sentence belongs. That is, the first sentence and the third sentence are not divided into one sentence group.

Embodiments in accordance with this disclosure are not limited to the example above. For example, the processor 120 may divide the sentences into one sentence group when types of the sentences are all identical. In this case, if the second sentence is determined to be weather and description in the example of FIG. 2C, the processor 120 may distinguish each of the first sentence, the second sentence, and the third sentence into different sentence groups.

The type of a sentence may include a main type and a sub type. For example, "weather" may be a main type, and "weather" may include a sub type such as "sunny", "cloudy", "rain", "snow" or the like. In this case, the processor 120 may determine the first sentence group and the second sentence group as one sentence group if the main type and the sub-type of the first sentence group and the second sentence group are all identical. In the memory 110, each of the plurality of words, a main type and a sub-type corresponding to each of the plurality of words, and information matched with a score of each type, may be stored.

Figure 3:
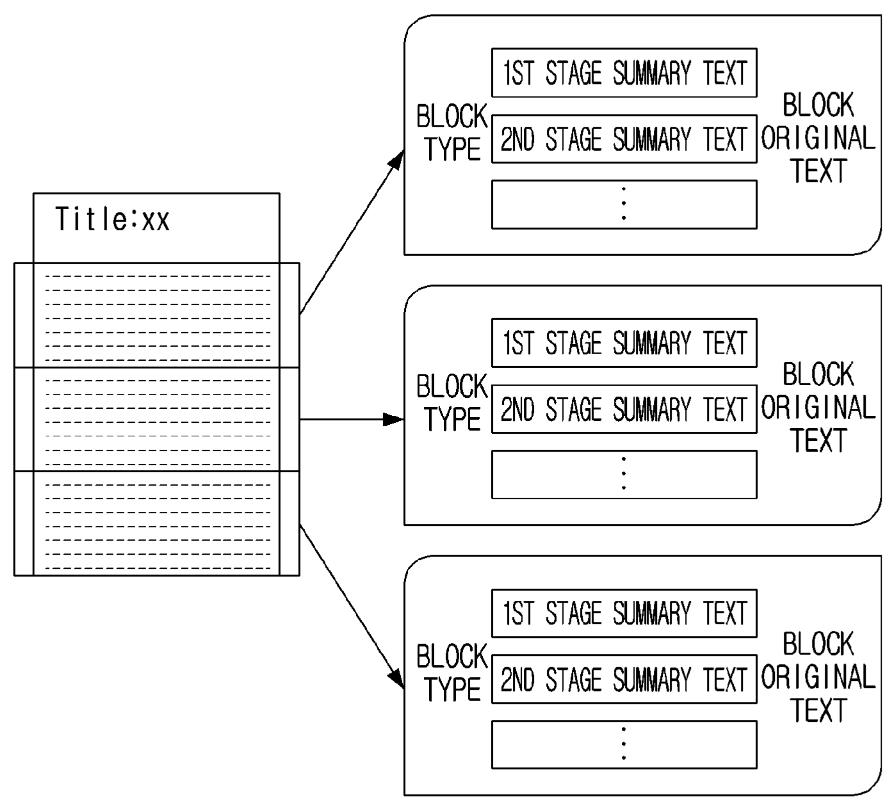
FIG. 3 illustrates a diagram illustrating an example method of summarizing according to an embodiment.

FIG. 3 illustrates a diagram of an example method of summarizing according to an embodiment.

The processor 120 may summarize at least one sentence included in the sentence group based on the user's preference for the type of sentence group. For example, as illustrated in FIG. 3, if the user's preference for the type of the first sentence group is greater than or equal to a first threshold value, the processor 120 may not summarize a first sentence group, if the user's preference for the type of the second sentence group is less than a first threshold value and greater than or equal to the second threshold value, summarize the second sentence group to a first summary level, and if the user's preference for the type of the third sentence group is less than the second threshold value and greater than or equal to a third threshold value, may summarize the third sentence group to a second summary level that is simpler than the first summary level. The processor 120 may skip a sentence group when the user's preferences are less than the third threshold value.

More specifically, for example, the user's preferences may be determined from zero to ten points, and may be initially set to ten points by types. If the user's preference is ten points, the processor 120 may output the sentence group without the summary. That is, the user's preference is not reflected, and the processor 120 may output a document without a summary.

After the preference of the user is changed according to the user interaction, the processor 120 may summarize or skip a sentence group. For example, the processor 120 may summarize the sentence group to a first summary level if the preference of the user is between six and nine points. The processor may also summarize the sentence group to a second summary level if the preference of the user is between the two points and five points, and may skip the sentence group if the user's preference becomes low to a zero point or a one point. For example, the first-step summary of FIG. 3 is a summary summarized in the first summary level, and the second-step summary of FIG. 3 can be a summary summarized in the second summary level.

The processor 120 may summarize a sentence group in various ways. For example, the processor 120 may summarize the sentence group as a ratio corresponding to the user's preference. For example, the processor 120 may summarize a plurality of sentences included in the sentence group by 50% if the preference of the user is between six and nine points, and may summarize the plurality of sentences included in the sentence group by 20% if the user's preference is between two points and five points. The processor 120 may summarize a sentence group based on the number of the plurality of sentences included in the sentence group. In the above-described example, the processor 120 may summarize the sentence group to 50 sentences if the user's preference is between six point and nine point, and the number of a plurality of sentences included in the sentence group is 100, and may summarize the sentence group to 30 sentences if the user's preference is between two points and five points and the number of the plurality of sentences included in the sentence group is 100.

The processor 120 may calculate the importance of a plurality of words included in each of the plurality of sentences to obtain the importance of each of the plurality of sentences. The method for calculating the importance of a plurality of words may use a method such as, but not limited to, the TF-IDF as described above. The processor 120 may summarize the sentence group based on the importance of each of the plurality of sentences included in the sentence group. For example, when a sentence group including 100 sentences is summarized to 50, the processor 120 may summarize a group by obtaining 50 sentences in the order of high importance of 100 sentences, and deleting the rest of the sentence group.

Embodiments in accordance with this disclosure are not limited to the example above. For example, the processor 120 may summarize a sentence group using various method. For example, the processor 120 may summarize a sentence group through a plurality of AI models.

An artificial intelligence model corresponding to each summary level can be stored in the memory 110. For example, a first artificial intelligence model corresponding to the first summary level and a second artificial intelligence model corresponding to the second summary level can be stored in the memory 110. The first artificial intelligence model may be a model that is obtained through AI learning of the sample sentence group and the sentence group in which the sample sentence group is summarized based on the first summary level, and the second artificial intelligence model may be a model obtained through AI learning of the sample sentence group and the sentence group in which the sample sentence group is summarized based on the second summary level.

Embodiments in accordance with this disclosure are not limited to the example above. For example, only one artificial intelligence model may be stored in the memory 110. In this case, the artificial intelligence model may further receive a summary level. For example, the processor 120 may input a sentence group and a summary level of a sentence group to an artificial intelligence model to obtain the summarized sentence group.

An example of second-step summary level is described above. However, embodiments in accordance with this disclosure are not limited to this example. For example, the step and score of a summary level may be implemented in various methods.

Figure 4:
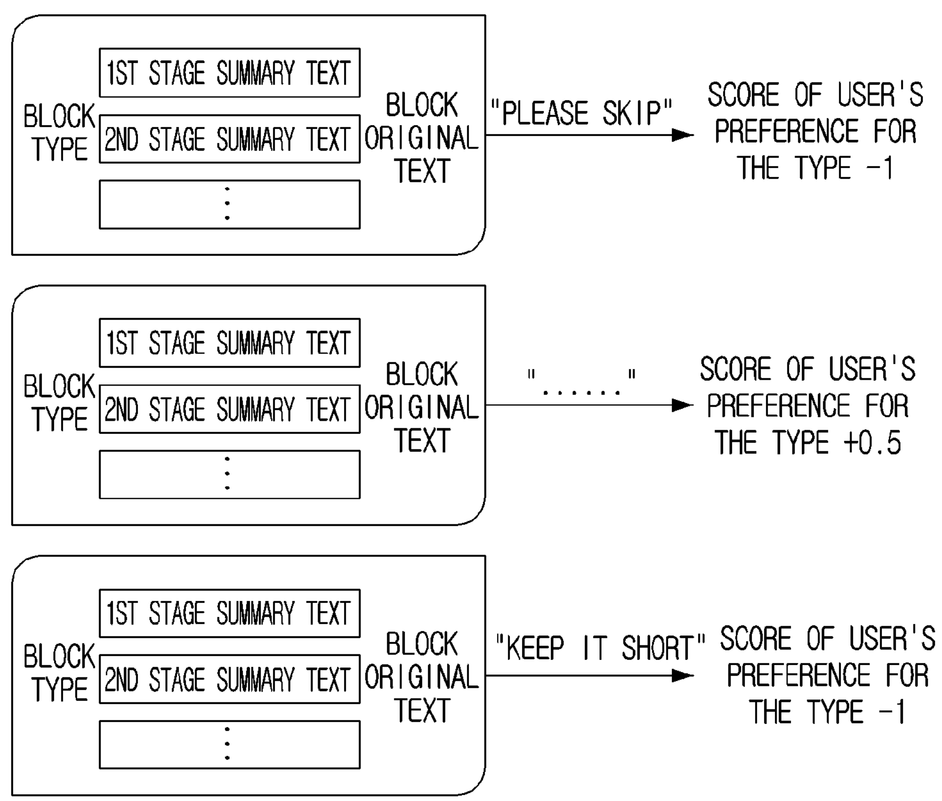
FIG. 4 illustrates a diagram illustrating an operation according to a user interaction according to an embodiment.

FIG. 4 illustrates a diagram of an example operation according to a user interaction according to an embodiment.

The processor 120 may receive user interaction while the sentence group is output. For example, the processor 120 may receive a user interaction of "please skip" while the sentence group is output, as shown in FIG. 4. In this case, the processor 120 may skip a sentence group which is being output and may reduce the user's preference score for the type of skipped sentence group by one point. Alternatively, the processor 120 may continue to output the sentence group if there is no user interaction while the sentence group is output, and may increase the user's preference score for the type of the input sentence group by 0.5 points. The processor 120 may receive the user interaction "keep it short," while the sentence group is output. In this case, the processor 120 may summarize a sentence group being output and output the summarized sentence group. The processor 120 may reduce the user's preference score for the type of the summarized sentence group to by one point.

Although the example of FIG. 4 is described with the user's preference score being reduced by one point, embodiments in accordance with this disclosure are not limited thereto. For example, the processor 120 may vary a change size of a user's preference according to the type of user interaction. For example, if the user interaction "please skip" is received, the processor 120 may reduce the user's preference score by two points, and when the user interaction "keep it short" is received, the processor 120 may reduce the user's preference score by one point. That is, the processor 120 may vary the change size of a user preference score when a sentence group is skipped and when a sentence group is summarized.

Alternatively, the processor 120 may vary a change size of a user preference score even when summarizing the sentence group. For example, the processor 120, when a user interaction of "keep it short" is received, may reduce the user's preference score by one point and may output the summarized sentence group. When a user interaction "keep it shorter" is received from a state in which the summarized sentence group is output, the user's preference score may be reduced by two points. That is, the processor 120 may determine a change size of a user preference score based on the number of user interaction input while outputting one sentence group.

Alternatively, the processor 120 may receive direct user interaction with respect to user preference. For example, the processor 120 may reset the user preference for the type of the sentence group if there is a user interaction "please reset preference" while outputting the sentence group.

The processor 120 may provide a user with information of outputting the summarized sentence group. For example, the processor 120 may inform the user that the currently output sentence group is summarized by turning on a light emitting diode (LED) lamp provided on the electronic apparatus 100. In this case, the user may want to listen to an original copy of the summarized sentence group, and the processor 120 may stop the output of the summarized sentence group when the user interaction "please do not summarize" is received, and output the sentence group before the summary.

FIG. 5 illustrates a diagram of an example output of a sentence group according to a critical word according to an embodiment.

The processor 120 may identify the frequency of a plurality of words included in the document and identify the first number of words as a first critical word based on the frequency of the plurality of words. The processor 120 may also summarize at least one sentence included in each of the plurality of sentence groups based on the user preference for types of each of the sentence group and the first critical word.

For example, the processor 120 may identify the frequency of a plurality of words included in the document and arrange the plurality of words in a descending order, as shown in FIG. 5. The processor 120 may identify that apple has been included in 395 times, sea is 255 times, and Kim is 231 times, and phone is 111 times in the document. The processor 120 may identify apple, sea, and Kim, which are three words having the highest frequency, as the first critical words. In this case, even if the user preference for the type of the sentence group is very low and thus needs to be skipped, the processor 120 may not skip the sentence group if the first critical word is included. Alternatively, the processor 120 may output the sentence including the first critical word among at least one sentence included in the sentence group when the preference of the user with respect to the type of the sentence group is very low and the sentence group needs to be skipped.

The processor 120 may re-identify the frequency of the plurality of additional words included in the same sentence as the first number of words, identify the second number of additional words as the second critical word based on the frequency of the plurality of additional words, and summarize at least one sentence included in each of the plurality of sentence groups based on the user's preference, the first critical word, and the second critical word for each type of the plurality of sentence groups.

The processor 120 may summarize a sentence group by reflecting a first critical word and a second critical word differently. For example, the processor 120 may exclude a sentence including even one of a first critical word among at least one of the sentences included in the sentence group from a subject of summary or skip. In this regard, the processor 120 may exclude a sentence including two or more second critical words among the at least one sentence included in the sentence group from the subject of summary or skip.

The operation may be performed on a unit of a sentence group other than a sentence. For example, the processor 120 may not summarize or skip the sentence group if the first critical word in the sentence group is greater than or equal to the first number. The processor 120 may not summarize or skip the sentence group if the second critical word is greater than or equal to the second number which is greater than the first number.

The processor 120 may assign a different weights to the first critical word and the second critical word, and may not summarize or skip the sentence group if the total sum of weights in the sentence group is greater than or equal to the threshold. For example, the processor 120 may assign weight 2 to the first critical word and weight 1 to the second critical word, and may calculate a total sum of the weight of the first critical word and the second critical word included in the sentence group. If the total sum of the calculated weights is greater than or equal to 50, the processor 120 may not summarize or skip the sentence group.

Figure 6:
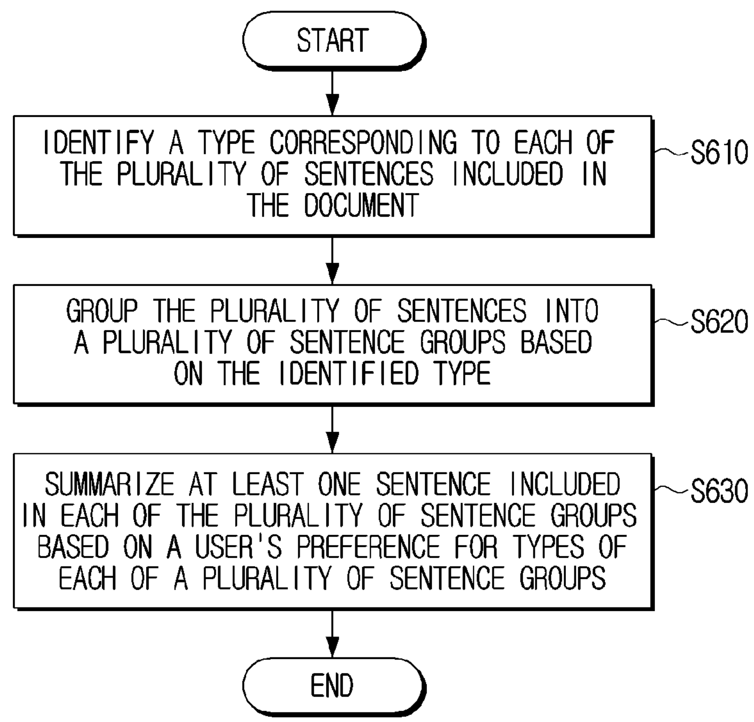
FIG. 6 illustrates a flowchart illustrating a control method of an electronic apparatus according to an embodiment.

FIG. 6 illustrates a flowchart of an example control method of an electronic apparatus according to an embodiment.

First, a type corresponding to each of the plurality of sentences included in the document is identified in operation S610. The plurality of sentences are grouped into a plurality of sentence groups based on the identified type in operation S620. At least one sentence included in each of the plurality of sentence groups is summarized based on a user's preference for each type of each sentence group in operation S630.

The step of, based on a user interaction being input, updating a user's preference for each type of the plurality of sentence groups based on the user interaction may be further included.

The summarizing step in operation S630 may include outputting the first sentence group in a non-summarized state if the user's preference with respect to the type of the first sentence group among the plurality of sentence groups is greater than or equal to the first threshold value, summarizing the first sentence group when the user's preference for the type of the first sentence group is less than the first threshold value, and outputting the summarized first sentence group.

The updating step may further include updating a user's preference for the type of the first sentence group based on the user interaction when the user interaction is input while the first sentence group is outputted.

The updating step may decrease a user's preference for the type of the first sentence group if the user interaction is a skip command or a summary command, and if there is no user interaction, the user's preference of the type of the first sentence group may be increased.

The summarizing in operation S630 may include, based on the user's preference for the type of the first sentence group being less than a first threshold and greater than or equal to a second threshold value, summarizing the first sentence group in a first summary level, based on the user's preference for the type of the first sentence group being less than a second threshold value and greater than or equal to a third threshold value, summarizing the first sentence group to a second summary level simpler than the first summary level, and based on the user's preference for the type of the first sentence group being less than the third threshold, skipping the first sentence group and outputting the second sentence group immediately after the first sentence group.

The step of identifying a frequency of a plurality of words included in the document and identifying a first number of words as a first critical word based on the frequency of the plurality of words are further included and the summarizing step in operation S630 may include summarizing at least one sentence included in each of the plurality of sentence groups based on the user's preference and the first critical word for each type of the plurality of sentence groups.

The method further includes re-identifying a frequency of a plurality of additional words included in the same sentence as the first number of words and identifying a second number of additional words as a second critical word based on the frequency of the plurality of additional words. The summarizing step in operation S630 may include summarizing at least one sentence included in each of the plurality of sentence groups based on the user's preference, the first critical word, and the second critical word for each type of the plurality of sentence groups.

The identifying step in operation S610 may include identifying a type of one sentence based on a score for a plurality of types representing each word included in one sentence among the plurality of sentence groups.

The method may further include updating at least one of a plurality of types or scores for each type representing the word included in one sentence based on the identified type if the type of one sentence is identified.

The grouping step in operation S620 may include dividing a plurality of sentences into a plurality of sentence groups by identifying at least one sentence adjacent to each other and having the same type.

According to various embodiments, the electronic apparatus may group a plurality of sentences included in a document into a plurality of sentence groups according to a type, and summarize each of the plurality of sentence groups based on a user's preference for each type of the plurality of sentence groups, thereby enabling a document to be summarized reflecting the preference of the user.

The electronic apparatus may update a user's preference for each type of a plurality of sentence groups according to user interaction, and may actively reflect a user's preference.

Meanwhile, various embodiments of the disclosure may be implemented in software, including instructions stored on machine-readable storage media readable by a machine (e.g., a computer). An apparatus may call instructions from the storage medium, and execute the called instruction, including an image processing apparatus (for example, electronic apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

According to an embodiment of the disclosure, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

The above-described various embodiments may be implemented in a computer- or similar device-readable recording medium using software, hardware, or a combination thereof. In some embodiments, the embodiments described herein may be implemented by the processor itself. Through the software implementation, the embodiments such as a procedure and function described herein may be implemented with separate software modules. The software modules may perform one or more functions and operations described herein.

Computer instructions for performing the processing operations of a device according to various embodiments described above may be stored in a non-transitory computer-readable medium. The computer instructions stored in the non-transitory computer-readable medium, when executed by a processor of a particular device, may cause a particular device to perform processing operation in the device according to the various embodiments described above. A non-transitory computer-readable medium refers to a medium that stores data semi-permanently, rather than a medium that stores data for a short time, such as a register, cache, memory, etc., and is capable of being read by a device. A specific example of a non-transitory computer-readable medium may be a compact disc (CD), a digital versatile disc (DVD), a hard disk, a Blu-ray disc, a universal serial bus (USB), a memory card, a read only memory (ROM), and the like.

According to various embodiments of the disclosure, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic apparatus comprising:

memory configured to store at least one instruction, at least one type that each of a plurality of words represents, and at least one score corresponding to the at least one type that each of the plurality of words represents;

a processor, connected to the memory, and configured to control the electronic apparatus, wherein the processor is further configured to:

identify a plurality of types and a plurality of scores corresponding to the plurality of types based on each of a plurality of words included in each of a plurality of sentences included in a document, sum scores for each type corresponding to each of the plurality of words included in each of the plurality of sentences, identify a type with a highest score from among each type corresponding to each of the plurality of words included in each of the plurality of sentences, as a type corresponding to the each of the plurality of sentences, each of the plurality of scores of the type being updated in a summary process of the document, wherein the summary process is performed based on a user's preference in accordance with a user interaction, group the plurality of sentences into a plurality of sentence groups based on the identified type, and update the user's preference for types of each of the plurality of sentence groups based on the user interaction in response to the user interaction being input; and an outputter operably connected to the processor and the memory, the outputter configured to:

output a first sentence group in a non-summarized state in response to the user's preference for a type of the first sentence group, among the plurality of sentence groups, being greater than or equal to a first threshold value, and summarize the first sentence group and output the summarized first sentence group in response to the user's preference for the type of the first sentence group being less than the first threshold value, and wherein the processor is further configured to summarize at least one sentence included in each of the plurality of sentence groups based on the user's preference for types of each of the plurality of sentence groups.

2. The electronic apparatus of claim 1, further comprising an inputter, wherein the processor is operably coupled to the inputter and further configured to, in response to the user interaction being input through the inputter while the first sentence group is being output, update the user's preference for the type of the first sentence group based on the user interaction.

3. The electronic apparatus of claim 2, wherein the processor is further configured to:

in response to the user interaction being a skip command or a summary command, decrease the user's preference for the type of the first sentence group, and in response to the user interaction not being present, increase the user's preference for the type of the first sentence group.

4. The electronic apparatus of claim 1, wherein the processor is further configured to:

in response to the user's preference for the type of the first sentence group being less than the first threshold value and greater than or equal to a second threshold value, summarize the first sentence group to a first summary level, in response to the user's preference for the type of the first sentence group being less than the second threshold value and greater than or equal to a third threshold value, summarize the first sentence group to a second summary level that is simpler than the first summary level, and in response to the user's preference for the type of the first sentence group being less than the third threshold value, skip the first sentence group and control the outputter to output a second sentence group right after the first sentence group.

5. The electronic apparatus of claim 4, wherein the processor is further configured to:

summarize the first sentence group to the first summary level by decreasing a number of a plurality of sentences included in the first sentence group by a first ratio, and summarize the first sentence group to the second summary level by decreasing the number of the plurality of sentences included in the first sentence group by a second ratio that is less than the first ratio.

6. The electronic apparatus of claim 5, wherein the processor is further configured to:

obtain an importance level of each of a plurality of sentences included in the first sentence group based on a frequency of a word included in the first sentence group from the document, and summarize the first sentence group based on the importance level of each of the plurality of sentences included in the first sentence group.

7. The electronic apparatus of claim 1, wherein the processor is further configured to:

identify a frequency of a plurality of words included in the document, identify a word of a first number as a first critical word based on the frequency of the plurality of words, and summarize at least one sentence included in each of the plurality of sentence groups based on the user's preference for types of each of the plurality of sentence groups and the first critical word.

8. The electronic apparatus of claim 7, wherein the processor is further configured to:

re-identify a frequency of a plurality of additional words included in a sentence same as the word of the first number, identify an additional word of a second number as a second critical word based on the frequency of the plurality of additional words, and summarize at least one sentence included in each of the plurality of sentence groups based on the user's preference for types of each of the plurality of sentence groups, the first critical word, and the second critical word.

9. The electronic apparatus of claim 1, wherein the memory is further configured to store a score with respect to a plurality of types representing each of a plurality of words, and wherein the processor is further configured to identify a type of the one sentence based on a score of a plurality of types representing each of a word included in one sentence among the plurality of sentence groups.

10. The electronic apparatus of claim 9, wherein the processor is further configured to: in response to the type of the one sentence being identified, update at least one of a plurality of types representing each of a word included in the one sentence or a score of each type based on the identified type.

11. The electronic apparatus of claim 1, wherein the processor is further configured to: divide the plurality of sentences into the plurality of sentence groups by identifying at least one sentence that has a same type and is adjacent to at least one second sentence, from the plurality of sentences, into one sentence group.

12. A method of an electronic apparatus, the method comprising:

identifying a plurality of types and a plurality of scores corresponding to the plurality of types based on each of a plurality of words included in each of a plurality of sentences included in a document;

summing scores for each type corresponding to each of the plurality of words included in each of the plurality of sentences, identifying a type with a highest score from among each type corresponding to each of the plurality of words included in each of the plurality of sentences, as a type corresponding to the each of the plurality of sentences, wherein a summary process is performed based on a user's preference in accordance with a user interaction;

grouping the plurality of sentences into a plurality of sentence groups based on the identified type;

updating the user's preference for types of each of the plurality of sentence groups based on the user interaction in response to the user interaction being input;

outputting a first sentence group in a non-summarized state in response to the user's preference for a type of the first sentence group, among the plurality of sentence groups, being greater than or equal to a first threshold value;

summarizing the first sentence group and output the summarized first sentence group in response to the user's preference for the type of the first sentence group being less than the first threshold value; and summarizing at least one sentence included in each of the plurality of sentence groups based on the user's preference for types of each of the plurality of sentence groups.

13. The method of claim 12, wherein updating the user's preference further comprises, in response to the user interaction being input through an inputter while the first sentence group is being output, updating the user's preference for the type of the first sentence group based on the user interaction.

14. The method of claim 13, wherein updating the user's preference comprises:

in response to the user interaction being a skip command or a summary command, decreasing the user's preference for the type of the first sentence group, and in response to the user interaction not being present, increasing the user's preference for the type of the first sentence group.

15. The method of claim 12, wherein summarizing comprises:

in response to the user's preference for the type of the first sentence group being less than the first threshold value and greater than or equal to a second threshold value, summarizing the first sentence group to a first summary level, in response to the user's preference for the type of the first sentence group being less than the second threshold value and greater than or equal to a third threshold value, summarizing the first sentence group to a second summary level that is simpler than the first summary level, and in response to the user's preference for the type of the first sentence group being less than the third threshold value, skipping the first sentence group and outputting a second sentence group right after the first sentence group.

16. The method of claim 15, wherein summarizing the first sentence group to the first summary level comprises:

summarizing the first sentence group to the first summary level by decreasing a number of a plurality of sentences included in the first sentence group by a first ratio, and wherein summarizing the first sentence group to the second summary level comprises summarizing the first sentence group to the second summary level by decreasing the number of the plurality of sentences included in the first sentence group by a second ratio that is less than the first ratio.

* * * * *